July 24, 1956
A. W. FRANCIS
2,756,266
HYDROCARBON SEPARATION
Filed March 19, 1953
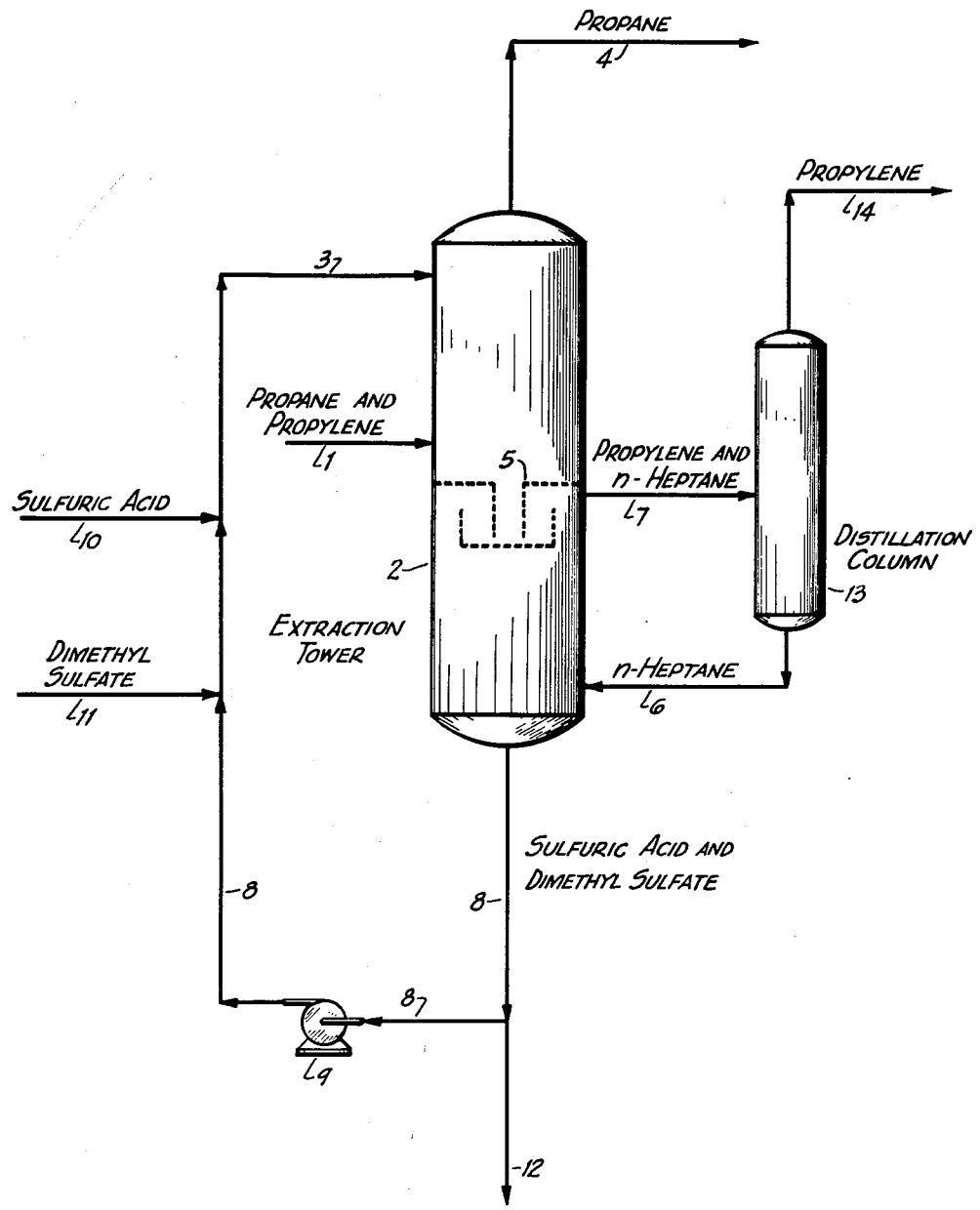
INVENTOR.
ALFRED W. FRANCIS
BY
Robert D. Flynn
AGENT

United States Patent Office 2,756,266
Patented July 24, 1956

2,756,266

HYDROCARBON SEPARATION

Alfred W. Francis, Woodbury, N. J., assignor to Socony Mobil Oil Company, Inc., a corporation of New York Application March 19, 1953, Serial No. 343,387

15 Claims. (Cl. 260—677)

This invention is concerned with a process for recovering olefins from hydrocarbon mixtures containing the same. More specifically, the invention is directed to separating olefins from hydrocarbon mixtures by virtue of the selective or preferential reactivity of olefins with sulfuric acid, and recovering the olefins from their association with the acid.

It is well known in the art that strong or concentrated sulfuric acid (specific gravity 1.76 to 1.84) reacts rapidly with various olefins to form alkyl sulfuric acids or alkyl hydrogen sulfates. And it is also well known that paraffins are practically inert to sulfuric acid except under unusual conditions; for example, branched chain paraffins which can be alkylated by the olefins present. Thus, the behavior of sulfuric acid with aliphatic hydrocarbons of different degrees of carbon-carbon saturation has formed the basis of a means for separating olefins from paraffins. However, the reaction of sulfuric acid with olefins has not proved to be a satisfactory means for recovering olefins as such, because, although the reaction is reversible, interfering reactions take place during the conversion of the alkyl sulfuric acids or alkyl hydrogen sulfates to the original olefins and sulfuric acid. For example, polymerization, sulfur dioxide evolution and alkylation occur during the latter conversion. In this way, the quantity of olefins which can be recovered from the initial mixture of olefins and paraffins is lessened appreciably.

I am familiar with United States Letters Patent 2,407,386 in which the patentee, H. W. Scheeline, describes extraction of butenes with about 83% sulfuric acid and then reextracts the butenes with propane or pentanes. However, at column 3, lines 50 through 53, the patentee states:

"The stripping or the extraction process requires a suitable length of time as the reversion of alcohol or alkyl sulfate to olefins is relatively slow."

With sulfuric acid of the strength suggested by Scheeline, I have found this reverse reaction to be so slow as to be economically impractical. This slow reaction is avoided in the process of this invention, inasmuch as the olefin is stripped out of its mixture with sulfuric acid before it has combined chemically with the acid.

I have now discovered that sulfuric acid can be used to separate olefins from hydrocarbon mixtures containing the same and the olefins so separated can be recovered efficiently without serious loss of the olefins to interfering reactions. The process of this invention comprises: contacting a hydrocarbon mixture containing an olefin, with sulfuric acid containing a suitable organic diluent, whereupon an extract comprising said olefin, sulfuric acid and organic diluent therefor and a raffinate comprising other hydrocarbons of said mixture are formed; separating said extract and raffinate; and contacting said extract with a secondary solvent comprising a paraffin or a naphthene of the character defined hereinbelow, whereupon a second extract comprising said olefin and said secondary solvent and a second raffinate comprising said sulfuric acid and said organic diluent therefor, are formed; and distilling said second extract to recover said olefin.

Since the formation of alkyl sulfuric acids or alkyl sulfates, is a fairly rapid reaction, the two extractions involved herein are preferably made as rapidly as possible, in order to minimize the time of contact of acid and olefin. Other means for controlling the reaction include the use of a low temperature and dilution of sulfuric acid.

It is an object of this invention, therefore, to provide an effective means for separating an olefin from a mixture containing the same. An important object of this invention is the selective separation of olefins having from two to about eight carbon atoms per molecule, from mixtures containing the same and other hydrocarbons, particularly paraffins. A related object of this invention is to provide an efficient process for so selectively separating said olefins and for converting the same to their corresponding alcohols. Other objects and advantages of the invention will be apparent from the following description.

In order that the invention may be more readily understood, reference is now made to the drawing which represents a typical flow sheet of the process.

In the drawing, a liquid mixture of propane and propylene is charged from line 1 to a central section of tower 2. The tower is operated at a temperature of about 0° C. and a pressure of about 50 pounds per square inch. A mixture comprising about 20–30 per cent by weight of 95 per cent sulfuric acid and the balance dimethyl sulfate, is fed from line 3 into an upper section of tower 2. Thus, the hydrocarbon mixture and the sulfuric acid-dimethyl sulfate mixture are in countercurrent contact in the upper portion of the tower. Propane is unaffected by such contact and flows upwardly through the tower and is withdrawn through line 4. Propylene, however, becomes associated with sulfuric acid and dimethyl sulfate. The resulting mixture flows downwardly through the tower through liquid seal 5 to the lower portion of the tower. This seal is substantially like an inverted bubble cap. It permits free flow of heavy liquid downward through it, but prevents upward flow of light liquid.

A secondary solvent, n-heptane is introduced into a lower section of the tower through line 6, and is in countercurrent contact with the downwardly flowing mixture of propylene, dimethyl sulfate and sulfuric acid. Heptane removes the propylene from the latter mixture and the heptane-propylene mixture is removed from the tower through line 7. A mixture of sulfuric acid and dimethyl sulfate is withdrawn from the bottom of the tower through line 8 and is recycled to line 3 by means of pump 9 in the line 8. Fresh sulfuric acid and dimethyl sulfate can be added to the system via lines 10 and 11, respectively, as needed.

In spite of the controls indicated, namely, the rapid reextraction, low temperature and diluted acid, some esterification of the acid by the propylene occurs and isopropyl sulfuric acid is formed. Moderate concentrations of this ester do no harm in the process. To prevent excessive accumulation of isopropyl sulfuric acid, a portion of the acid mixture can be withdrawn through line 12 before it is recycled. The acid mixture so removed can be diluted with water and distilled, causing hydrolysis of the isopropyl sulfuric acid to isopropanol—a useful product. The residual mixture of methyl sulfate and sulfuric acid, obtained from the hydrolysis and distillation, can be returned to the process (as via line 3).

The proportion of acid mixture so removed via line 12 and treated as described above, depends upon economic factors. In some cases, as when isopropyl alcohol is in short supply, it will be desirable to withdraw all of the acid mixture and process it for isopropyl alcohol before returning it to the extraction process. In other cases, little or no processing for the alcohol will be practiced.

The heptane-propylene mixture in line 7 is fed to distillation column 13, from which propylene is taken as an overhead product through line 14 and from which heptane is taken as a bottoms product through line 6, and recycled to the extraction tower.

As indicated by the foregoing illustration, the process of this invention is desirable for recovering propylene from mixtures of the same and paraffins. However, the process is also effective for so recovering olefins (alkenes) having from two to about eight carbon atoms per molecule. Typical of the mono- and di-olefins which can be so recovered are: ethylene, propylene, 1-butene, 2-butene, pentenes, hexenes, heptenes, octenes and diolefins such as butadiene and pentadienes. Such olefins can be in admixture with paraffins, naphthenes, aromatics, air, carbon dioxide and/or hydrogen, inasmuch as such compounds or substances do not react with, nor are extracted by, sulfuric acid under the conditions of operation of the new process. For example, an olefin-paraffin-aromatic mixture can be treated in the manner described herein to effect removal of the olefins; the remaining paraffin-aromatic mixtures can then be treated according to the procedure described in my related application Serial No. 343,389, filed March 19, 1953. The latter procedure involves extraction of aromatics with a solution comprising oleum and dimethyl sulfate in specific proportions.

The organic diluents for sulfuric acid, as contemplated herein, are compounds which mix with sulfuric acid without appreciable evolution of heat, and preferably are compounds which do not mix with paraffins at temperatures of the order of about 0° C. Thus, representative organic diluents are: sulfuric acid esters such as dimethyl sulfate, methyl sulfuric acid; ethyl sulfuric acid; nitrohydrocarbons such as nitrobenzene, nitromethane, nitroethane; sulfonic acids such as methyl sulfonic acid, and ethyl sulfonic acid. Particularly preferred of such diluents are: dimethyl sulfate and nitrobenzene.

Unsuited as organic diluents herein are organic compounds containing hydroxyl, amino, aldehydo and/or keto groups. These react with sulfuric acid evolving a large amount of heat and altering its properties greatly. Hydrocarbons likewise are unsatisfactory because they do not mix with sulfuric acid, unless they are capable of reacting with it. In addition, water is not satisfactory as a diluent, although a relatively small amount in admixture with sulfuric acid can be tolerated, so long as a satisfactory organic diluent is present. By way of explanation, water and alcohols are unsatisfactory as diluents for sulfuric acid, because the diluted acid is not physically miscible with an olefin such as propylene, even though methanol does mix with propylene. Moreover, when water and alcohols mix with sulfuric acid, they reduce the latter's chemical activity excessively rather than proportionally to its concentration in the resulting mixtures.

A major use for propylene is in the manufacture of isopropyl alcohol. If propylene is intended for this use, it is practicable to omit the reextraction with heptane from the tower and omit the liquid seal therein. The entire propylene content of the charge stock is extracted with the sulfuric acid used herein, and is allowed to combine chemically with the acid to form isopropyl sulfuric acid. The resultant product is then processed by dilution with water and distillation, to produce isopropyl alcohol as in the conventional process for hydrating propylene—except for the herein described dilution of the acid with dimethyl sulfate.

This new hydration process has several advantages over conventional processes. The sulfuric acid employed in the extraction stage, although containing a diluent, is still concentrated in the sense that it is physically miscible with olefins, so that there is no delay in its attack upon them. Yet, its activity is controlled by dilution with the dimethyl sulfate so that there is little or no tendency toward undesirable side reactions such as polymerization or sulfur dioxide formation.

The sulfuric acids used herein in extracting olefins can be identified by their specific gravity values, varying from a specific gravity from about 1.76 to about 1.84, preferably 1.82 to 1.84. Concentrated sulfuric acid (e. g., specific gravity 1.834; 95% acid) is physically completely miscible with liquid olefins, ethylene, propylene and 2-butene, and is practically immiscible with liquid paraffins, propane and n-butane. In other words the sulfuric acid, before dilution with a suitable organic diluent, can contain some water but not over ten per cent by weight or it will not mix with olefins. Preferably the sulfuric acid, before dilution with a suitable organic diluent, can contain at least about 5 per cent of water. The limits applicable to water also apply approximately to methyl alcohol, since a minor quantity of methyl alcohol is substantially equivalent herein to dilution with minor quantities of water and dimethyl sulfate.

The diluted solvent, sulfuric acid and the organic diluent, therefore, should contain at least about ten per cent by weight of sulfuric acid, otherwise the selectivity of the acid for olefins over paraffins is so low as to be impractical. Yet, the diluted solvent should not contain more than about fifty per cent by weight of sulfuric acid, because the esterification reaction takes place too rapidly and because the selectivity of the acid is too high for the secondary solvent (e. g., heptane) to overcome. Preferably, however, the percentage of sulfuric acid in the diluted solvent should fall within the range of from about 20 to about 40 per cent by weight.

Secondary solvents contemplated herein, and illustrated above by n-heptane, are liquids miscible with the olefins, immiscible with sulfuric acid, immiscible with the aforesaid organic diluents, and chemically inert or unreactive with olefins, sulfuric acid and said diluents. The secondary solvents also have boiling points substantially higher or lower than the boiling point of the olefin being recovered, have freezing points below the extraction temperature and have low viscosities. Compounds possessed with all of such requirements, such that they are satisfactory secondary solvents, are paraffins and naphthenes having from about three to about thirteen carbon atoms per molecule. Typical of such hydrocarbons are: propane; butanes; pentanes, such as n-pentane and isopentane; hexanes, such as n-hexane, isohexane and diisopropyl; heptanes; octanes, such as n-octane and 2,2,4-trimethylpentane ("isooctane"); nonanes; decanes; undecanes; dodecanes; tridecanes; cyclopentane and alkylated derivatives thereof such as butyl cyclopentane; cyclohexane and alkylated derivatives thereof such as ethyl cyclohexane.

Of the secondary solvents described and illustrated above, n-heptane and "isooctane" have proven to be particularly satisfactory. As a further observation, it will be apparent that it is more advantageous to use n-heptane or "isooctane" in recovering propylene than in recovering a hexene, in view of the greater difference in boiling points. In general, it is recommended that the secondary solvent have at least about two more or less carbon atoms per molecule than the olefin being recovered.

With regard to operating conditions during both extractions, it is recommended that temperatures should be as low as practicable. Nonetheless, the temperatures should not be below about —40° C., at which temperature the reagents (e. g., sulfuric acid and dimethyl sulfate) begin to freeze. Preferably, temperatures of about 0° C. are used, and temperatures as high as about +25° C. can be used. Pressures used are only such as to maintain the hydrocarbon mixture in the liquid state, if desired. This will depend upon the temperature used and the hydrocarbons being treated. However, the olefins can be treated in gaseous form at lower pressures, and even at atmospheric pressure.

The quantity of sulfuric acid and organic diluent therefor used in the initial extraction, will depend upon: the olefin concentration of the hydrocarbon mixture being treated; the efficiency of separation desired; the operating temperatures and pressures; the particular organic diluent used; the speed with which the acid mixture passes through the extraction vessel.

It is not necessary that the quantity of sulfuric acid be as much as equivalent to the olefin being extracted, since the olefin is much more soluble in the diluent than is the paraffin. However, the quantity of acid used should bear some relation to that of the olefin. The molar ratio is preferably from about one-sixth mol to about one mol of acid for each mol of olefin.

Correspondingly, the quantity of secondary solvent used in the second extraction is dependent upon a variety of factors, such as: the particular secondary solvent used; the quantity of olefin extracted by the sulfuric acid; operating temperature and pressure; the speed, etc. as above. As a guide, several typical examples are described below, in which all parts are by weight unless otherwise specified.

Example I

Propylene (1.54 parts), 96.8 per cent sulfuric acid (1.79 parts) and dimethyl sulfate (4.01 parts) were added to a glass tube (7 mm. in diameter). The resulting mixture was homogeneous to a depth of 86 mms. in the tube at 0° C. The tube was cooled to −78° C., opened and 2.75 parts of n-heptane were added. An upper layer comprising propylene and n-heptane was formed, with the interface at the 80 mm. depth level of the tube. The lower layer comprised dimethyl sulfate, sulfuric acid and some of the propylene charge. The upper layer was removed from the tube and distilled; 0.25 part of propylene was recovered from the upper layer.

A second extraction of the remaining material in the tube, using 2.75 parts of n-heptane, made possible additional recovery of 0.13 part of propylene.

Example II

The procedure described in Example I was repeated, with the following quantities of materials: 1.59 parts of propylene; 1.20 parts of 96.8 per cent sulfuric acid and 4.01 parts of dimethyl sulfate. The resulting mixture was extracted twice at 0° C. with about 3.4 parts of n-heptane. The propylene recovered comprised 0.75 parts; a recovery of approximately 47 per cent.

Example III

Again following the procedure of Example I, a mixture of 6.57 parts of dimethyl sulfate, 0.83 part of 95 per cent sulfuric acid and 2.31 parts of propylene, was extracted five times at 0° C. with 3 parts of "isooctane," and the resulting "isooctane"—propylene extracts were distilled. Recovered propylene constituted 1.35 parts; a recovery of about 59 per cent.

Example IV

Again following the example of Example I, a homogenenous mixture of 6.62 parts of dimethyl sulfate, 4.14 parts of 90% sulfuric acid, and 2.77 parts of 2-butene was prepared at 0° C. and extracted once with 3.3 parts of n-hexane. Recovered 2-butene constituted 0.81 part; a recovery of 29%.

Example V

A mixture of 0.10 parts of dimethyl sulfate and 0.87 part of 90% sulfuric acid was contacted at 0° C. with a mixture of 1.22 parts of propylene and 1.29 parts of propane (48.7% propylene in the hydrocarbon mixture). A quantity, 0.53 part, of the hydrocarbon mixture dissolved in the dimethyl sulfate-sulfuric acid, constituted the lower layer of two layers which formed. The upper layer comprised hydrocarbons. The layers were separated. The lower layer was extracted with 3.3 parts of n-hexane at 0° C. The n-hexane extracted 0.33 part or 62% of the dissolved hydrocarbon. The n-hexane extract was separated and was warmed to room temperature (about 25° C.) whereupon a gas was evolved. The evolved gas was identified as substantially pure propylene.

I claim:

1. The process for separating a straight chain olefin from a hydrocarbon mixture containing the same and at least one hydrocarbon other than the olefin, said olefin having from two to about eight carbon atoms per molecule, which comprises: contacting said mixture, at a temperature between about −40° C. and about +25° C., with sulfuric acid in admixture with an organic diluent therefor, whereupon said olefin is preferentially extracted from said hydrocarbon mixture; said organic diluent being one which mixes with sulfuric acid without appreciable heat formation and which is immiscible with paraffins at temperatures of the order of 0° C., and said admixture containing from about ten percent to about fifty percent by weight of sulfuric acid having before dilution with said diluent a specific gravity of not less than 1.82, the total amount of water in said admixture being no more than ten percent of the sulfuric acid present.

2. The process defined by claim 1 wherein the hydrocarbon mixture comprises propylene and propane.

3. The process defined by claim 1 wherein said organic diluent is selected from the group consisting of sulfuric acid esters, sulfonic acids and nitro hydrocarbons.

4. The process defined by claim 1 wherein said organic diluent is dimethyl sulfate.

5. The process for recovering a straight chain olefin from a hydrocarbon mixture containing the same and at least one hydrocarbon other than the olefin, said olefin having from two to about eight carbon atoms per molecule, which comprises: contacting said mixture, at a temperature between about −40° C. and about +25° C., with sulfuric acid in admixture with an organic diluent therefore, whereupon said olefin is preferentially extracted from said hydrocarbon mixture, and an extract phase and a raffinate phase are formed, said extract phase comprising said olefin, sulfuric acid and said organic diluent and said raffinate comprising said other hydrocarbon, said organic diluent being one which mixes with sulfuric acid without appreciable heat formation and which is immiscible with paraffins at temperatures of the order of 0° C., and said admixture containing from about ten per cent to about fifty percent by weight of sulfuric acid having before dilution with said diluent a specific gravity of not less than 1.82, the total amount of water in said admixture being no more than ten percent of the sulfuric acid present; separating said extract and said raffinate; contacting said extract, at a temperature between about −40° C. and about +25° C., with a secondary solvent having a boiling point differing substantially from the boiling point of said olefin and being selected from the group consisting of a paraffin and a naphthene, each of which contains from about three to about thirteen carbon atoms per molecule, whereupon are formed a second extract comprising said olefin and said secondary solvent and a second raffinate comprising sulfuric acid and said organic diluent therefor; separating said second extract and said second raffinate; and distilling said second extract and recovering said olefin therefrom.

6. The process defined by claim 5 wherein the hydrocarbon mixture comprises propylene and propane.

7. The process defined by claim 5 wherein said organic diluent is selected from the group consisting of sulfuric acid esters, sulfonic acids and nitrohydrocarbons.

8. The process defined by claim 5 wherein said organic diluent is dimethyl sulfate.

9. The process defined by claim 5 wherein said secondary solvent is a paraffin.

10. The process defined by claim 5 wherein said secondary solvent is n-heptane.

11. The process defined by claim 5 wherein said extract and said raffinate are separated rapidly and said extract is contacted immediately thereafter with said secondary solvent.

12. A solution characterized by a high selectivity for olefins as opposed to paraffins, consisting essentially of: from about ten to about fifty percent by weight of sulfuric acid having a specific gravity of not less than 1.82, and an organic diluent therefor which mixes with sulfuric acid without appreciable heat formation and which is immiscible with paraffins at temperatures of the order of 0° C., the total amount of water in said solution being no more than ten percent of the sulfuric acid present.

13. A solution characterized by a high selectivity for olefins as opposed to paraffins, consisting essentially of: from about ten to about fifty percent by weight of sulfuric acid having a specific gravity of not less than 1.82, and a sulfuric acid ester, the total amount of water in said solution being no more than ten percent of the sulfuric acid present.

14. A solution characterized by a high selectivity for olefins as opposed to paraffins, consisting essentially of: from about twenty to about thirty percent by weight of sulfuric acid having a specific gravity of not less than 1.82, and dimethyl sulfate, the total amount of water in said solution being no more than about ten percent of the sulfuric acid present.

15. A solution characterized by a high selectivity for olefins as opposed to paraffins, consisting essentially of: from about ten percent to about fifty percent by weight of sulfuric acid having a specific gravity of not less than 1.82, and an organic diluent therefor selected from the group consisting of sulfuric acid esters, sulfonic acids and nitro hydrocarbons, the total amount of water in said solution being no more than ten percent of the sulfuric acid present.

References Cited in the file of this patent

UNITED STATES PATENTS

| | | |
|---|---|---|
| 2,139,000 | Cohen | Dec. 6, 1938 |
| 2,265,583 | Stevens et al. | Dec. 9, 1941 |
| 2,407,386 | Scheeline | Sept. 10, 1946 |
| 2,484,305 | Mayland et al. | Oct. 11, 1949 |
| 2,500,736 | Beach | Mar. 14, 1950 |
| 2,509,885 | Rupp et al. | May 30, 1950 |
| 2,515,006 | Hudson | July 11, 1950 |
| 2,576,535 | Proell | Nov. 27, 1951 |
| 2,670,391 | Lien et al. | Feb. 23, 1954 |